J. J. Bate.
Rendering Apparatus.
Nº 16,942.    Patented Oct. 21, 1856.

UNITED STATES PATENT OFFICE.

JOHN J. BATE, OF BROOKLYN, NEW YORK.

LARD-RENDERING KETTLE.

Specification of Letters Patent No. 15,942, dated October 21, 1856.

*To all whom it may concern:*

Be it known that I, JOHN J. BATE, of the city of Brooklyn, in the State of New York, have invented a certain new and useful Improvement for Economizing Fuel in Rendering Lard; and I do hereby declare the following to be a full, clear, and exact description thereof, reference being had to the accompanying drawing, in which—

Figure 1:
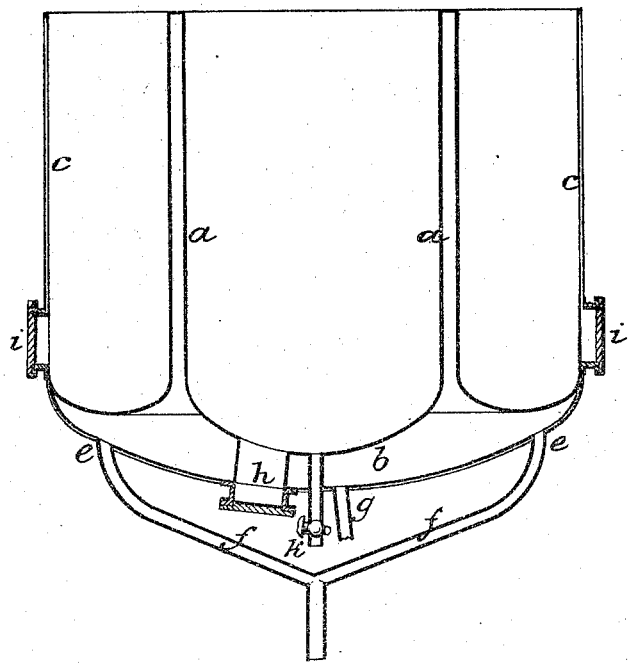
Figure 2:
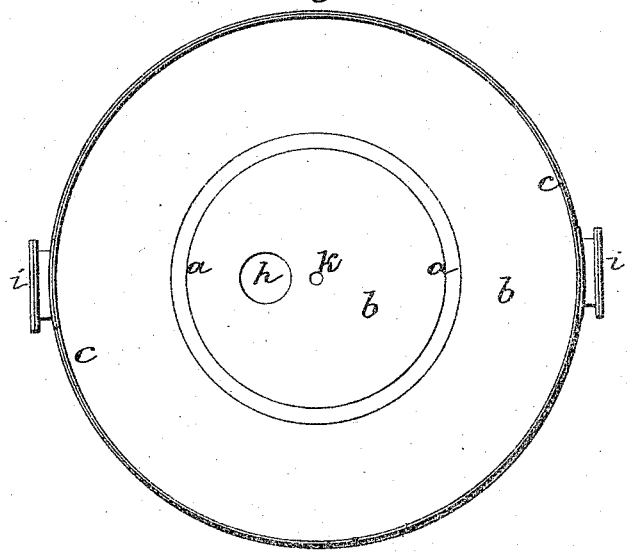

Figure 1 is a vertical section; Fig. 2, a plan.

My improved apparatus is for the purpose of economizing heat by preventing waste by radiation, so that all the heat evolved shall be used in rendering lard or other fatty substances.

I find by experiment that by the employment of a double kettle and introducing steam I can render lard, &c., much better and cheaper than by any other known method; but by the ordinary double kettle a very large portion of the heat is lost by radiation. To prevent this I form an annular chamber or outer kettle outside of the double kettle, which can be filled also with fatty substances that will be acted upon by the exterior radiated heat, by which a great economy of heat is effected and the cost of rendering reduced.

My apparatus is as follows:

I form a double kettle $a$, $a$, with a space all around between the outer and inner parts. The bottom $b$ is also double, but instead of being the size of the kettle it extends out all around a distance proportioned to the size of the apparatus and the particular work to be done. From the outer edge of this double bottom $b$ rises a rim $c$ extending up to the height of the double kettle, as clearly appears in the drawing, thus surrounding the double kettle with an annular chamber concentric therewith, into which the materials to be heated can be put.

The steam is admitted into the double bottom (which is convex downward) at its highest points $e$ near the outer edge, whence it passes into and around the space in the sides of the double kettle. The condensed steam is finally drawn off back to the boiler through a pipe from the center or lowest point of the double bottom.

$f$ $f$ is the induction steam pipe; $g$, the eduction pipe.

$h$ is the manhole into the inner boiler.

$i$ are two manholes in the outer chamber.

$k$ is the faucet for drawing off the melted fat from the inner kettle.

I put sometimes the firmer and better qualities of leaf lard into the interior kettle and a coarser kind into the outer one, which can be worked slower, and if desirable have steam introduced into it, or the fat can be in some cases heated up in the outer kettle and the operation completed in the inner one, and there may for certain kinds of work be a communication between them near the bottom. But generally I intend the apparatus for different kinds or qualities of fat. The economy thus obtained is very great, which is still further augmented by felting or otherwise coating the outside with felting or other non-conductor.

Having thus fully described my improved kettle for rendering fatty materials what I claim as new therein and for which I desire to secure Letters Patent is—

The combination of the double steam kettle with the annular chamber substantially in the manner and for the purposes set forth and covering the exterior of said chamber with a non-conductor.

JOHN J. BATE.

Witnesses:
ISAAC VAN HAGEN,
J. C. GREENOUGH.